United States Patent [19]
Kimura

[11] Patent Number: 5,150,644
[45] Date of Patent: Sep. 29, 1992

[54] RELEASE VALVE MECHANISM IN A FLUID OPERATED LINEAR ACTUATOR FOR A PORTABLE CUTTER OR THE LIKE

[75] Inventor: Kiyoshi Kimura, Fujisawa, Japan

[73] Assignee: Kabushiku Kasisha Ogura, Kanagawa, Japan

[21] Appl. No.: 683,074

[22] Filed: Apr. 10, 1991

[30] Foreign Application Priority Data

Apr. 17, 1990 [JP] Japan .................. 2-40945
May 21, 1990 [JP] Japan .................. 2-52841

[51] Int. Cl.⁵ .............................. F15B 15/22
[52] U.S. Cl. .............................. 91/395; 91/410; 91/419
[58] Field of Search .................. 91/392, 394, 395, 396, 91/397, 400, 404, 419, 428, 403, 410

[56] References Cited

U.S. PATENT DOCUMENTS

| | | | |
|---|---|---|---|
| 488,837 | 12/1892 | Rowland | 91/395 |
| 593,258 | 11/1897 | Watson | 91/404 X |
| 1,604,548 | 10/1926 | Dapron | 91/395 |
| 2,878,648 | 3/1959 | Norman et al. | 91/403 X |
| 3,998,132 | 12/1976 | Rasigade | 91/395 |
| 4,092,904 | 6/1978 | Schreiber | 91/395 |
| 4,138,928 | 2/1979 | Pilch | 91/395 X |
| 4,766,750 | 8/1988 | Brinkman | 91/400 X |

FOREIGN PATENT DOCUMENTS

| | | | |
|---|---|---|---|
| 999215 | 11/1976 | Canada | 91/395 |
| 1293026 | 6/1964 | Fed. Rep. of Germany | 91/395 |
| 105664 | 8/1979 | Japan | 91/395 |

*Primary Examiner*—Edward K. Look
*Assistant Examiner*—John Ryznic
*Attorney, Agent, or Firm*—Dickstein, Shapiro & Morin

[57] ABSTRACT

A single acting, spring return hydraulic cylinder suitable for use as an actuator of a portable cutter or the like. A piston slidably received in the cylinder has formed therein a hollow and a hole communicating the follow with a fluid chamber on one side of the piston. For discharging the fluid from the fluid chamber through a discharge port in one end of the cylinder upon full extension of the cylinder, a release valve mechanism is provided which comprises a valve stem slidably extending through the hole in the piston into the hollow in the piston, and a valve head formed on one end of the valve stem and received in the hollow in the piston. One or more expansions are formed in the piston for the admission of the pressurized fluid from the fluid chamber into the hollow in the piston during piston travel away the one end of the cylinder. The valve stem remains seated against the one end of the cylinder during such piston travel, holding the discharge port closed, under the fluid pressure acting on the valve head. The pressurized fluid being admitted into the piston hollow through the hole expansions acts upon the valve head at or toward the end of the piston stroke, thereby causing the valve stem to uncover the discharge port. An alternate embodiment is disclosed.

9 Claims, 8 Drawing Sheets

FIG. I

RELEASE VALVE MECHANISM IN A FLUID OPERATED LINEAR ACTUATOR FOR A PORTABLE CUTTER OR THE LIKE

BACKGROUND OF THE INVENTION

This invention relates generally to fluid operated linear actuators, and more specifically to those particularly well suited for use in portable, hydraulic cutters, punchers or the like. Still more particularly, the invention pertains to improvements in a release valve mechanism in such linear actuators.

Portable, hydraulic cutters have been developed for cutting reinforcing steel rods or wire, metal made pipe, etc., at sites of construction. They have won extensive popularity among field workers by virtue of their portability and ease of handling. There have also been developed portable, hydraulic punchers for working on sheet steel, and benders for working on steel rods and pipe.

All such devices incorporate hydraulic drive means of one type or another. A typical hydraulic drive means of this kind is a combination of a hydraulic pump and a hydraulic linear actuator or cylinder of the single acting, spring return type, both enclosed in an essentially single, compact housing. The pump supplies a hydraulic fluid under pressure needed for the extension of the linear actuator. A cutting tool such as a blade is attached to the piston rod of the linear actuator. The cutting tool cuts a desired object as the piston is driven back and forth.

A hydraulic cutter of the above general construction is described and claimed in U.S. Pat. No. 3,733,699, and its improvement in Japanese Unexamined Utility Model Publication No. 60-66411.

As disclosed in the Japanese utility model application, the hydraulic cutter includes a release valve mechanism for automatically opening the fluid discharge port of the linear actuator upon full extension. As the fluid is discharged from its fluid chamber through the port, the linear actuator will contract under spring pressure. The proper functioning of the release valve mechanism is therefore essential for the successful operation of the cutter.

As heretofore constructed, the release valve mechanism has included a valve spool received in part in an axial hollow in the piston of the linear actuator. The valve spool is movable relative to the piston into and out of abutment against one end of the actuator for covering and uncovering the discharge port formed therein. Two springs are employed for biasing the valve spool away from the discharge port. The piston holds the valve spool closing the discharge port against the forces of the two valve springs, when the actuator is fully contracted under the force of the return spring. When the actuator is extending under fluid pressure, too, the valve spool holds the discharge port closed under the force of the pressurized fluid that has been admitted into the piston hollow and which acts endwise on the valve spool. Then, upon full extension of the actuator, one of the valve springs becomes so compressed that the valve spool travels away from the actuator end thereby opening the discharge port.

The release valve mechanism of this prior art construction is objectionable for the following reasons. Upon full extension of the actuator, and when the valve spool is about to travel away from the actuator end under the biases of the two valve springs, the fluid pressure that has been admitted into the piston hollow acts endwise on the valve spool, urging the same against the actuator end in opposition to the spring biases. Consequently, in cases where the valve springs are not strong enough, the valve spool has been rather slow in uncovering the discharge port. This drawback has so far been circumvented by making the valve springs heavy enough to overcome the fluid pressure acting on the valve spool.

SUMMARY OF THE INVENTION

The present invention solves the problem of how to make the release valve mechanism more quick acting and positive in operation and simpler in construction than heretofore.

Briefly, the invention may be summarized as a fluid operated linear actuator comprising a piston slidably received in a housing and defining therein a fluid chamber between the piston and one end of the housing. The piston has formed therein a hollow and a hole communicating the hollow with the fluid chamber. A fluid discharge port is formed in said one end of the housing for the discharge of a fluid. A release valve means is disposed in the fluid chamber and extends through the hole in the piston and into the hollow in the piston so as to permit relative movement between the release valve means and the piston. The release valve means includes a valve head which is disposed in the hollow in the piston and which is movable relative to the housing for opening and closing the fluid discharge port. There is one or more hole expansions or fluid passageways formed in the piston so as to be contiguous to the hole therein for the admission of the pressurized fluid from the fluid chamber into the hollow in the piston during the travel of the piston away from said one end of the housing under the fluid pressure, with the release valve means held closing the fluid discharge port under the fluid pressure acting on the valve head during such piston travel. The maximum diameter of the hole inclusive of the hole expansion or expansions is less than the diameter of the valve head of the release valve means. Therefore, the pressurized fluid being admitted into the hollow in the piston through the hole expansions acts on the valve head at or toward the end of the travel of the piston away from said one end of the housing thereby causing the release valve means to open the fluid discharge port.

In one embodiment of the invention the release valve means further comprises a valve stem slidably extending through the hole in the piston and having the valve head formed on one end thereof. The valve stem is movable with the valve head into and out of abutment against said one end of the housing for opening and closing the fluid discharge port. In another embodiment the release valve means further comprises a sleeve rigidly joined at one end to said one end of the housing and extending through the hole in the piston so as to permit the movement of the piston. The sleeve has a hollow extending therethrough for communicating the hollow in the piston with the fluid discharge port. The valve stem, the valve head formed on one end thereof, movably extends into the hollow in the sleeve, so that the valve head is movable with the valve stem into and out of abutment against the other end of the sleeve for opening and closing the fluid discharge port.

In both embodiments outlined above, which are to be more fully disclosed subsequently, the pressurized fluid being admitted into the piston hollow through the hole expansions acts on the valve head at or toward the end of the travel of the piston away from said one end of the housing. The pressurized fluid is thus effectively utilized for causing the valve head to open the fluid discharge port upon full extension of the actuator. This fact, combined with the absence of fluid pressure acting to hold the release valve seated against the discharge port at or toward the end of actuator expansion, makes it necessary to provide only one spring, compared with two heretofore needed, for biasing the valve away from the discharge port.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
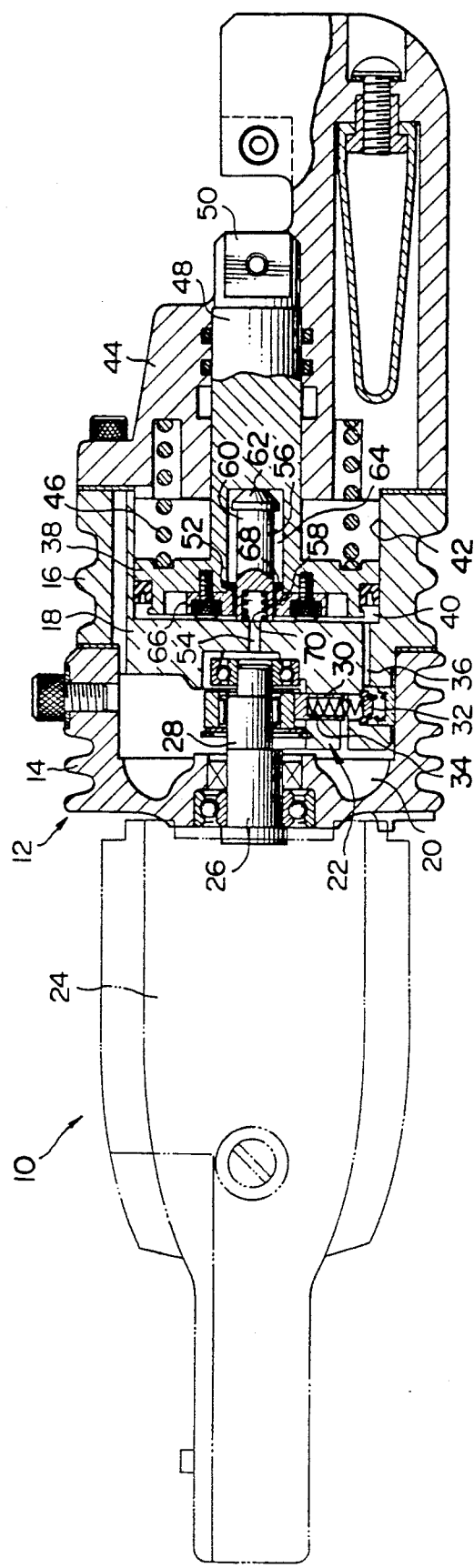
FIG. 1 is an axial section through a portable, hydraulic cutter embodying the principles of the present invention.

The present invention will now be described in detail as embodied in the portable, hydraulic cutter shown in FIG. 1 and therein generally designated 10. The cutter 10 has a housing 12 of approximately tubular shape comprising a pump section 14 and an actuator section 16, with a partition 18 therebetween. The partition 18 is shown to be of one piece construction with the actuator section 16 of the housing 12.

The pump section 14 of the housing 12 defines a fluid chamber 20 which is to be filled with a suitable working fluid, preferably a hydraulic oil. A pump 22 is mounted in the fluid chamber 20 for delivering the fluid under pressure into the actuator section 16 of the housing 12. Employed for driving the pump 22 is a motor 24 of any known or suitable construction mounted to the housing 12. The motor 24 has an output shaft 26 extending into the fluid chamber 20.

The pump 22 comprises an eccentric cam 28 on the motor output shaft 26, and a piston 30 driven back and forth by the cam 28. A check valve 32 complete with a spring 34 is disposed in a fluid passageway leading from the fluid chamber 20 to an intake port 36 open to the actuator section 16 of the housing 12. The check valve 32 permits the flow of the pressurized fluid into the actuator section 16 but prevents any return flow.

The actuator section 16 of the housing 12 has a piston 38 slidably mounted therein. The piston 38 divides the interior of the actuator section 16 into another fluid chamber 40, between the piston and the partition 18, and a spring chamber 42, between the piston and an end cap 44 of the housing 12. The second fluid chamber 40 will be hereinafter referred to as the actuator fluid chamber or simply as the actuator chamber in contradistinction from the first recited fluid chamber 20, which will be hereinafter referred to as the pump fluid chamber or simply as the pump chamber.

The noted fluid intake port 36 in the partition 18 is open to the actuator fluid chamber 40, supplying the pressurized fluid for causing the piston 38 to travel toward the end cap 44 of the housing 12. The spring chamber 42 has a helical compression spring 46 mounted therein for urging the piston 38 toward the partition 18. The piston 38 has a piston rod 48 slidably extending through the end cap 44 and carrying a cutting blade 50 on its end projecting from the end cap. Thus the actuator section 16 provides a hydraulic cylinder of the familiar single acting, spring return type for thrusting the cutting blade 50 and hence for cutting a desired object such as a steel rod or wire.

The reference numeral 52 in FIG. 1 generally denotes a release valve mechanism forming the gist of this invention. The release valve mechanism 52 functions to cover and uncover a fluid discharge port 54 formed in the partition 18 for the discharge of the fluid from the actuator fluid chamber 40 back into the pump fluid chamber 20. The release valve mechanism 52 holds the discharge port 54 closed both when the piston rod 48 is contracted as shown in FIG. 1 and when it is being extended, and opens the discharge port at or toward the end of the extension stroke of the piston 38.

Figure 2:
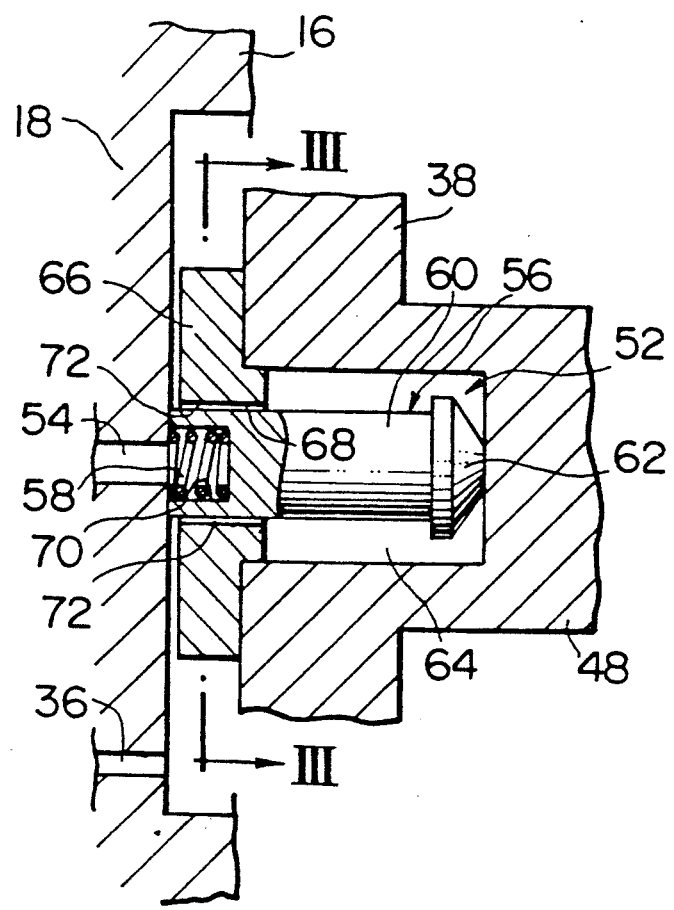
FIG. 2 is an enlarged, fragmentary axial section through the cutter, showing in particular the release valve mechanism of the cutter, the release valve mechanism being herein shown holding the fluid discharge port closed, with the piston rod fully contracted.

As illustrated on an enlarged scale in FIG. 2, the release valve mechanism 52 comprises a valve member 56 movable into and out of abutment against the partition 18 for opening and closing the fluid discharge port 54, and a valve spring 58 acting between the partition and the valve member for biasing the latter away from the former. The valve member 56 comprises a stem 60 and a head 62 of approximately frustoconical shape formed on one end of the stem.

The piston 38 has a hollow 64 defined axially therein so as to be open toward the partition 18. The open end of the piston hollow 64 is closed by a closure plate 66. This closure plate has formed therein a hole 68 communicating the piston hollow 64 with the actuator chamber 40. The hole 68 is in axial alignment with, and of smaller diameter than, the piston hollow 64. Although shown in FIG. 1 to be fastened to the piston 38 for the ease of manufacture, the closure plate 66 may be considered integral part of the piston for the purposes of this invention. Thus the hole 68 may be thought of as being formed in the piston 38.

The valve stem 60 of the release valve mechanism 52 slidably extends through the piston hole 68. The head 62 on one end of the valve stem 60 is disposed within the piston hollow 64. The other end of the valve stem 60 is recessed at 70 to accommodate the valve spring 58. When held against partition 18 as shown in FIGS. 1 and 2, the face at this other end of the valve stem 60, made annular by the creation of the recess 70, fluid tightly surrounds the fluid discharge port 54.

A most pronounced feature of this invention resides in one or more, two in this particular embodiment, fluid passageways 72 formed in the closure plate 66 or, essentially, in the piston 38. The fluid passageways extend along, and are contiguous to, the piston hole 68.

Figure 3:
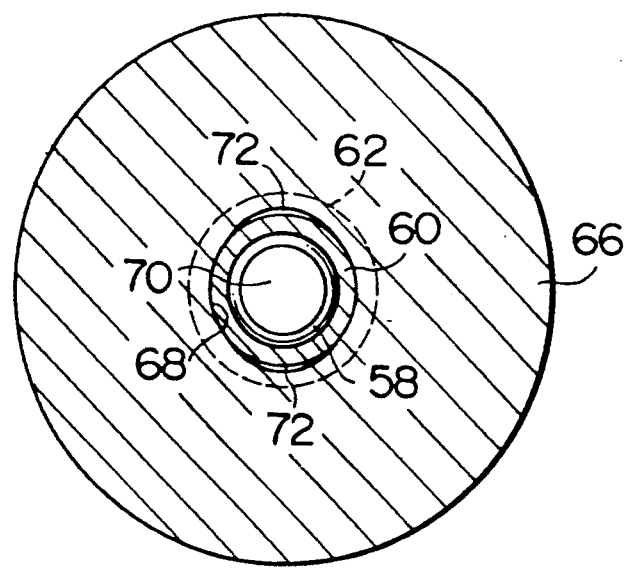
FIG. 3 is a still more enlarged cross section through the release valve mechanism, taken along the line III—III in FIG. 2.

As best revealed by FIG. 3, the fluid passageways 72 are formed in the closure plate 66 as crescent shaped expansions of the hole 68 in diametrically opposite positions thereof. The maximum diameter of the hole 68, inclusive of the fluid passageways or hole expansions 72, is less than the diameter of the valve head 62.

Operation

Let us assume that the hydraulic cutter 10 of the foregoing construction is now at rest, with the piston rod 48 fully contracted as shown in FIG. 1. The piston 38 is positioned closest to the partition 18 under the force of the return spring 46. The piston 38 when in this position holds the valve member 56 of the release valve mechanism 52 against the partition 18 in opposition to the force of the valve spring 58, so that the fluid discharge port 54 is closed.

Then, as the motor 24 is set into rotation, the pump 22 will be driven to pressurize the hydraulic fluid contained in the pump chamber 20. The pressurized fluid will flow through the check valve 32 and the intake port 36 into the actuator chamber 40. The fluid pressure building up in the actuator chamber 40 will act on the piston 38, causing the same to travel toward the end cap 44 against the force of the return spring 46. With the piston rod 48 thus extended, the cutting blade 50 on its end will cut the desired object.

During the above extension stroke of the piston 38, the pressurized fluid will flow into the piston hollow 64 via the passageways 72 in the closure plate 66. The pressurized fluid, on being thus admitted into the piston hollow 64, will act on the frustoconical head 62 of the release valve member 56 in a direction for urging the valve member against the partition 18. It is understood that this fluid pressure on the valve head 52 is greater than the force of the valve spring 58. Thus the release valve member 56 will hold the discharge port 54 closed despite the travel of the piston 38 away from the partition 18, with the closure plate 66 sliding over the valve member.

Figure 5:
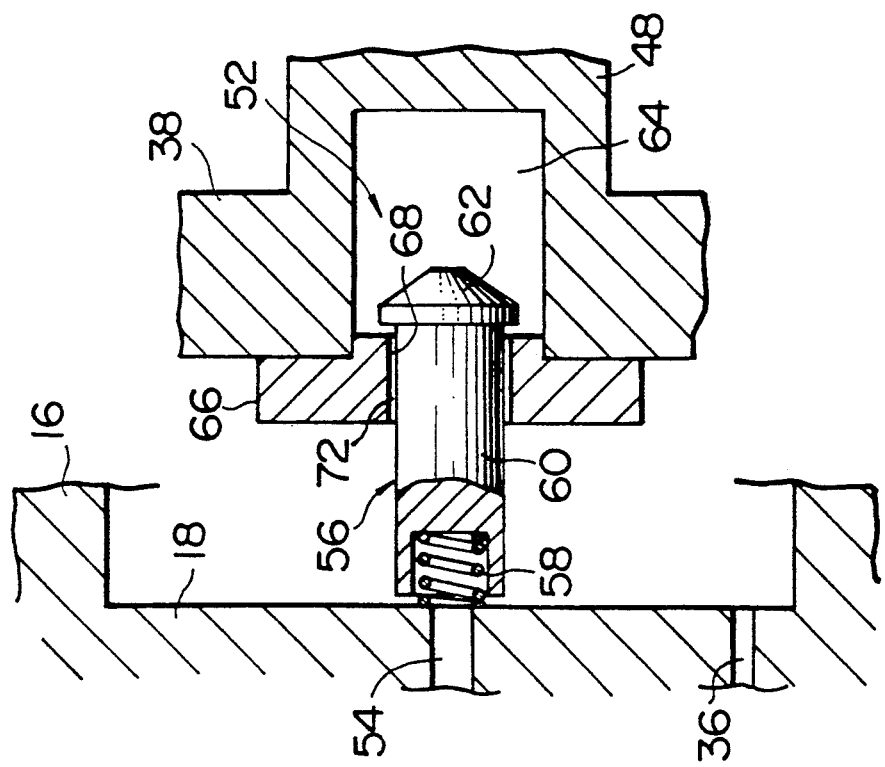
FIG. 5 is also a view similar to FIG. 2 except that the release valve mechanism is shown having opened the discharge port following the full extension of the piston rod.
Figure 4:
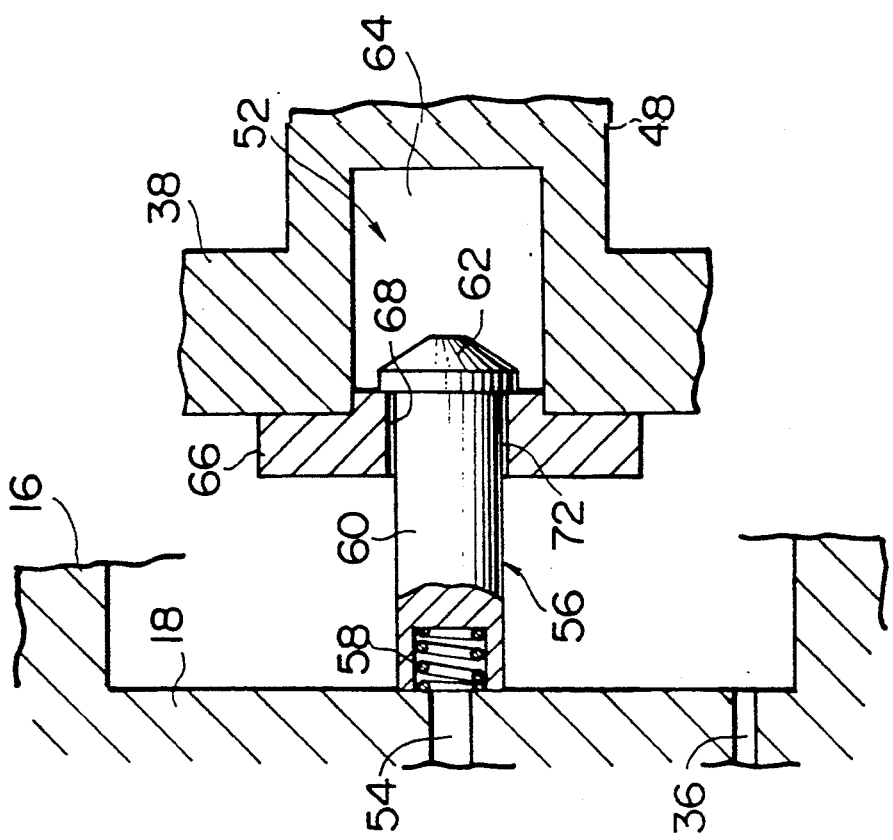
FIG. 4 is a view similar to FIG. 2 except that the piston rod is fully extended, with the release valve mechanism still holding the discharge port closed.

As illustrated in FIG. 4, the closure plate 66 on the piston 38 will come into abutment against the head 62 of the release valve member 56 upon full extension of the piston rod 48. Then the pressurized fluid will be no longer admitted into the piston hollow 64 because the diameter of the valve head 62 is greater than that of the piston hole 68 inclusive of the pair of fluid passageways or hole expansions 72. Then the pressurized fluid will act on the valve head 62 in a direction for urging the release valve member 56 away from the partition 18. Actually, however, the pressurized fluid may start acting on the valve head 62 in that direction shortly before the end of the extension stroke of the piston 38. This fluid pressure, combined with the force of the valve spring 58, will cause the release valve member 56 to travel instantaneously away from the partition 18 and hence to uncover the discharge port 54. FIG. 5 shows the release valve member 56 thus activated to open the discharge port 54.

With the discharge port 54 opened as above, the force of the return spring 46 in the spring chamber 42 will overcome the fluid pressure in the actuator fluid chamber 40. The piston 38 will start traveling on its contraction stroke under the force of the return spring 46 as the fluid in the actuator fluid chamber 40 flows into the discharge port 54 and thence back into the pump fluid chamber 20.

The release valve member 56 will remain forced away from the partition 18 by the valve spring 58 during the contraction stroke of the piston 38. As the discharge port 54 thus remains fully opened, the piston 38 will quickly travel from its FIG. 5 position to that of FIGS. 1 and 2. The piston 38 will move the release valve member 56 back into abutment against the partition 18 against the bias of the valve spring 58 toward the end of its contraction stroke, it being understood that the return spring 46 is much stronger than the valve spring 58. One cycle of operation has now been completed, and the cutter 10 has returned to the state of FIG. 1.

It will have been appreciated from the foregoing description of operation that the fluid pressure in the actuator fluid chamber 40 acts on the head 62 of the release valve member 56 in the direction for moving the valve member away from the partition 18 at or toward the end of the extension stroke of the piston 38. Conventionally, the fluid pressure in the actuator chamber 40 has been used solely for holding the discharge port closed. Two valve springs have therefore been necessary for biasing the release valve member away from the partition 18. One such conventional spring has been used in the same position as the valve spring 58 according to the invention, and the other, also a helical compression spring, has been sleeved upon the release valve member so as to extend between its head and the closure plate 66.

In contrast, according to the present invention, the fluid pressure in the actuator chamber 40 is additionally utilized for opening the discharge port 54. Only one spring 58 is therefore needed for energizing the release valve member 56 away from the partition 18.

Second Form

Figure 6:
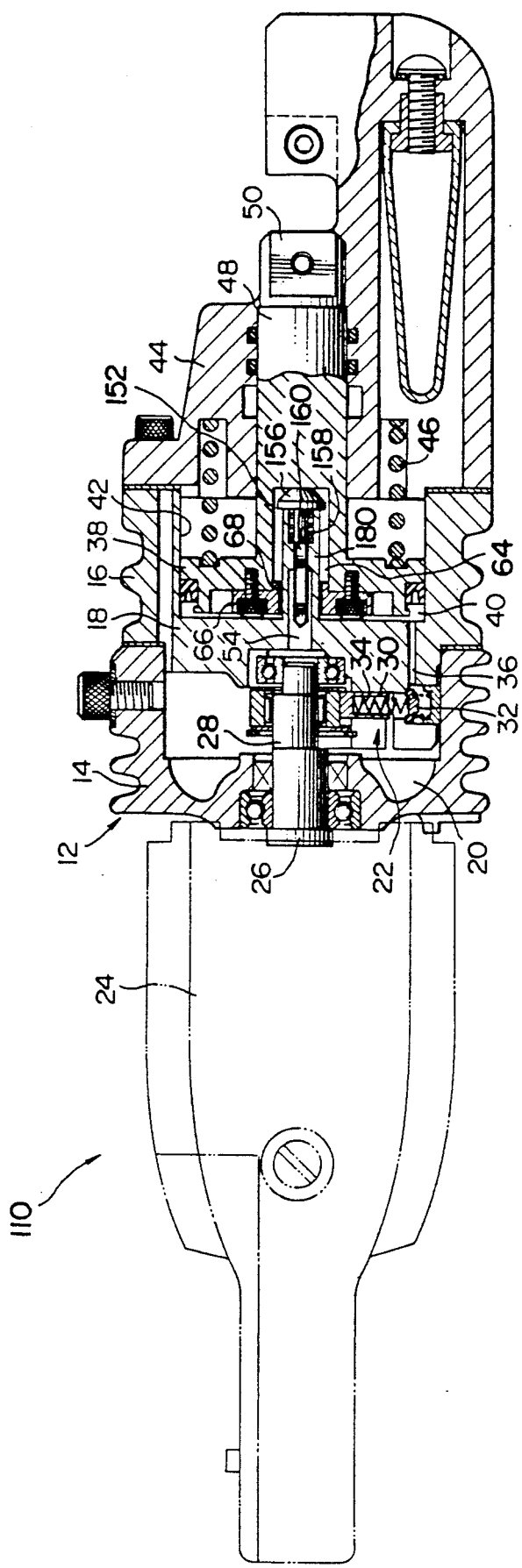
FIG. 6 is an axial section through another portable, hydraulic cutter embodying the principles of the present invention.

FIG. 6 shows another hydraulic cutter 110 embodying the present invention. This alternate cutter 110 differs from the FIG. 1 cutter 10 only in the construction of its release valve mechanism 152, so that only this release valve mechanism will be described in detail. The other parts of the alternate cutter 110 are identified in FIG. 6 and in the subsequent figures by the same reference numerals as used to denote the corresponding parts of the cutter 10, and their description will be omitted. The constituent parts of the modified release valve mechanism 152 will also be designated by the same reference numerals as used to denote their corresponding parts, if any, of the first disclosed release valve mechanism 152, but with the digit "1" prefixed to such numerals.

Figure 7:
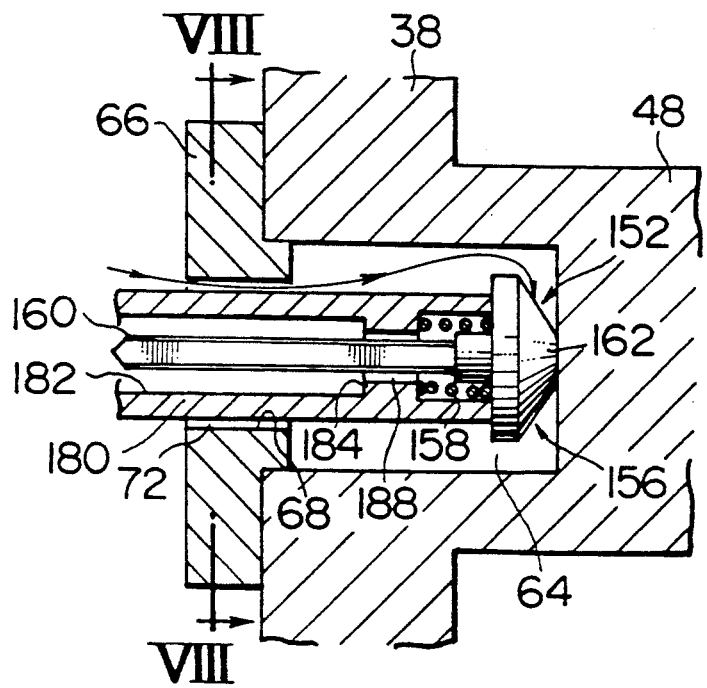
FIG. 7 is an enlarged, fragmentary axial section through the cutter, showing in particular an alternate form of release valve mechanism included therein, the release valve mechanism being herein shown holding the fluid discharge port closed, with the piston rod fully contracted.
Figure 8:
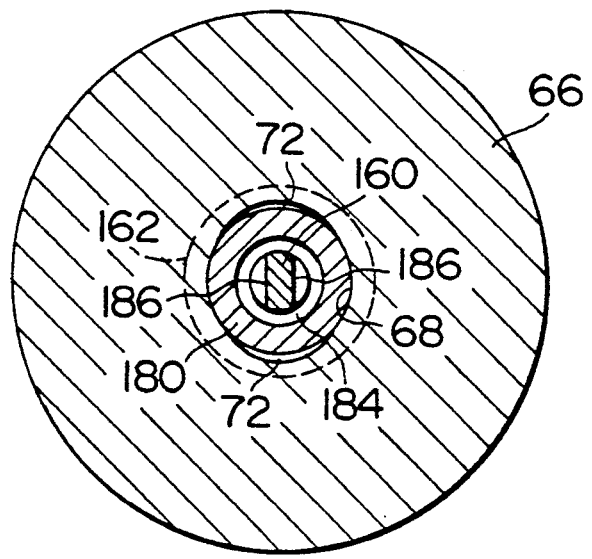
FIG. 8 is a still more enlarged cross section through the alternate release valve mechanism, taken along the line VIII—VIII in FIG. 7.

As shown also in FIGS. 7 and 8, the modified release valve mechanism 152 includes a sleeve 180 which is shown to be of one piece with the partition 18. Anchored at one end to the partition 18, the sleeve 180 extends with a sliding fit through the hole 68 in the closure plate 11 and into the hollow 64 in the piston 38. Thus the sleeve 180 may be thought of as having an entrance end received in the piston hollow 64 and an exit end anchored to the partition 18. The hollow 182 in the sleeve 180 communicates the piston hollow 64 with the discharge port 54 in the partition 18. The fluid in the actuator fluid chamber is therefore to be discharged through the piston hollow 64, the sleeve hollow 182, and the discharge port 54.

The modified release valve mechanism 152 further comprises a valve member 156 for opening and closing the entrance end of the sleeve 180, and a valve spring 158 biasing the valve member in a direction for opening the entrance end of the sleeve. The valve member 156 comprises a stem 160 and a head 162 of approximately frustoconical shape formed on one end of the stem. Inserted in the sleeve 180 through its entrance end, the valve stem 160 makes sliding engagement with a constriction 184 formed in the sleeve adjacent its entrance end. The valve head 162, which is of greater diameter than the sleeve 180, serves to cover and uncover the entrance end of the sleeve. The valve spring 158 is mounted between the valve head 162 and the sleeve constriction 184, biasing the valve head away from the entrance end of the sleeve 180.

FIG. 8 best indicates that the valve stem 160 has a pair of longitudinal recesses 186 formed in diametrically opposite positions thereon. Therefore, despite the sliding fit of the valve stem 160 in the sleeve constriction 184, the fluid can flow through the pair of passageways 188, FIG. 7, created by the recesses 186 between the valve stem 160 and the sleeve constriction 184.

As in the FIG. 1 cutter 10, the closure plate 66 for the piston hollow 64 has the pair of fluid passageways 72 formed therein as crescent shaped expansions of the hole 68 through which slidably extends the sleeve 180. The maximum diameter of the hole 68 inclusive of the fluid passageways or hole expansions 72 is less than the diameter of the valve head 162.

Operation of the Second Form

The operation of the FIG. 6 cutter 110 will be described only insofar as is concerned with the release valve mechanism 152. Both FIGS. 6 and 7 show the piston rod 48 fully contracted under the force of the return spring 46. The piston 38 when in this position will hold the valve member 156 of the release valve mechanism 152 pushed fully into the sleeve 180 against the bias of the valve spring 158. Therefore, seated against the entrance end of the sleeve 180, the head 162 of the release valve member 156 will hold closed the sleeve hollow 182 and, therefore, the fluid discharge port 54.

During the extension stroke of the piston 38 under the fluid pressure in the actuator fluid chamber 40, too, the head 162 of the release valve member 156 will remain seated on the entrance end of the sleeve 180, holding the discharge port 54 closed. This is because the pressurized fluid on being admitted into the actuator fluid chamber 40 from the pump fluid chamber 20 will flow immediately into the piston hollow 64 via the passageways 72 in the piston closure plate 66. The pressurized fluid in the piston hollow 64 will act on the frustoconical head 162 of the release valve member 156 in a direction for urging the valve member against the entrance end of the sleeve 180. Since this fluid pressure on the valve head 162 is assumed to be greater than the force of the valve spring 158, the release valve member 56 will hold the discharge port 54 closed despite the travel of the piston 38 away from the partition 18. The closure plate 66 will slide over the sleeve 180 with the travel of the piston 38.

Figure 9:
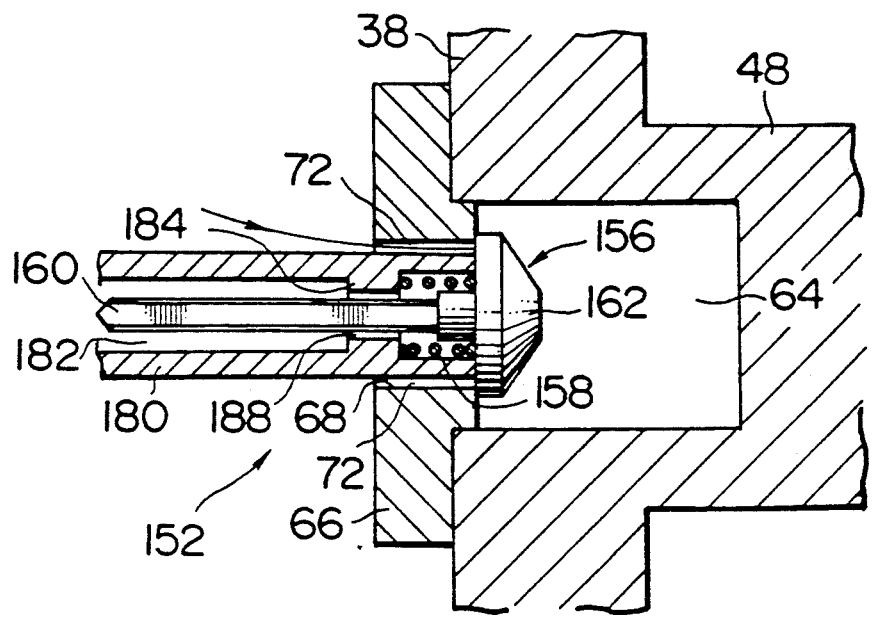
FIG. 9 is a view similar to FIG. 7 except that the piston rod is fully extended, with the release valve mechanism still holding the discharge port closed.

In FIG. 9 is shown the piston 38 in its position at the end of the extension stroke. The closure plate 66 on the piston 38 has come into abutment against the head 162 of the release valve member 156. Then the pressurized fluid will be no longer admitted into the piston hollow 64, since the diameter of the valve head 162 is greater than that of the piston hole 68 inclusive of the pair of fluid passageways or hole expansions 72. Then the pressurized fluid will act on the valve head 162 in a direction for unseating the release valve member 156 from the sleeve 180.

Figure 10:
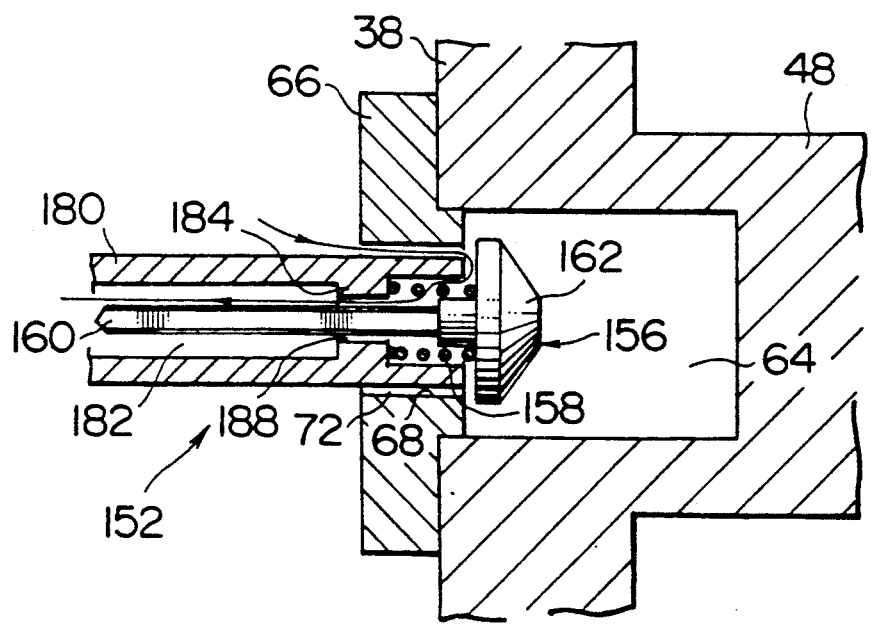
FIG. 10 is also a view similar to FIG. 7 except that the release valve mechanism is shown having opened the discharge port following the full extension of the piston rod.

Actually, as has been set forth in connection with the FIG. 1 cutter 10, the pressurized fluid may have stated acting on the valve head 162 in that direction shortly before the end of the extension stroke of the piston 38. Such fluid pressure, combined with the force of the valve spring 158, will instantaneously unseat the valve head 162 from the entrance end of the sleeve 180. FIG. 10 shows the release valve head 162 thus unseated to open the discharge port 54.

With the valve head 162 unseated as above, the force of the return spring 46 in the actuator spring chamber 42 will overcome the fluid pressure in the actuator fluid chamber 40. The piston 38 will start traveling under the force of the return spring 46 toward the partition 18 on its contraction stroke as the fluid in the actuator fluid chamber 40 flows into the sleeve 180 and back into the pump fluid chamber 20 via the pair of passageways 188 between the valve stem 160 and the sleeve constriction 184 and via the discharge port 54.

The release valve head 162 will remain forced away from the entrance end of the sleeve 180 by the valve spring 58 during the contraction stroke of the piston 38. As the discharge port 54 thus remains fully opened, the piston 38 will quickly travel from its FIG. 9 position to that of FIGS. 6 and 7. The piston 38 will push the valve head 162 back into abutment against the entrance end of the sleeve 180 against the bias of the valve spring 158 toward the end of its contraction stroke, it being understood that the return spring 46 is much stronger than the valve spring 158. One cycle of operation has now been completed.

Thus, in this alternate embodiment, too, the fluid pressure in the actuator fluid chamber 40 acts on the head 162 of the release valve member 156 in the direction for uncovering the entrance end of the sleeve 180, which is in communication with the discharge port 54, at or toward the end of the extension stroke of the piston 38. Only one valve spring 158 is therefore employed for energizing the valve head 162 away from the entrance end of the sleeve 180.

Conventionally, this type of cutter has also required two valve springs. One such conventional spring has been used in the same position as the valve spring 158 according to the invention. The other of the two conventional valve springs, also a helical compression spring, has been sleeved upon the valve stem 160 so as to extend between the closure plate 66 and the valve head 162. This second conventional spring is no longer necessary.

Additional Embodiments

Figure 13:
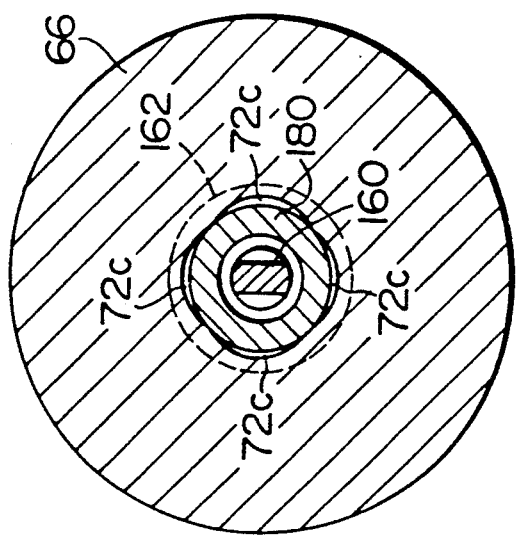
FIG. 13 is also a view similar to FIG. 8 but showing yet another alternate release valve mechanism for use in the FIG. 6 cutter.
Figure 12:
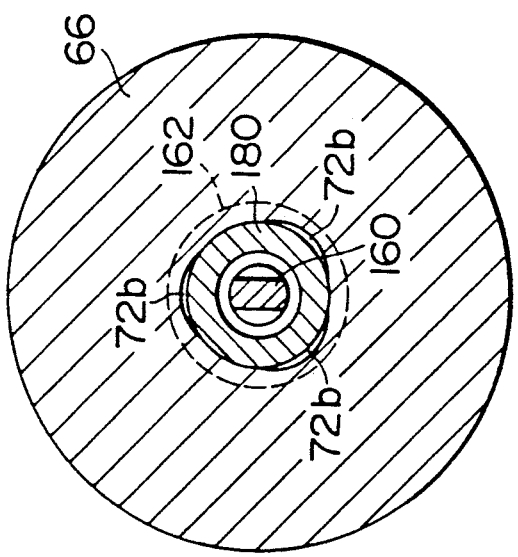
FIG. 12 is also a view similar to FIG. 8 but showing still another alternate release valve mechanism for use in the FIG. 6 cutter.
Figure 11:
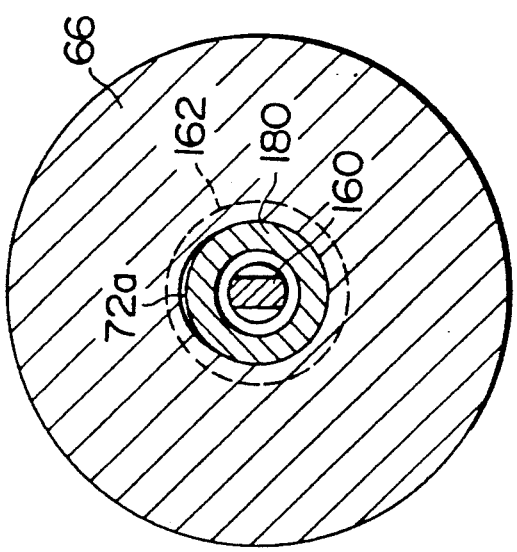
FIG. 11 is a view similar to FIG. 8 but showing another alternate release valve mechanism for use in the FIG. 6 cutter.

The fluid passageways or hole expansions 72 in the piston closure plate 66 shown in FIGS. 3 and 8 are subject to a variety of modifications in the practice of this invention. For instance, only one hole expansion $72_a$, may be provided as shown in FIG. 11. It is also possible to provide three hole expansions $72_b$ as in FIG. 12 or four hole expansions $72_c$ as in FIG. 13. All such hole expansions $72_a$, $72_b$ and $72_c$ should be of sufficient cross sectional size to assure fluid flow at a rate required for the purposes of the invention, but the maximum diameter of the hole 58 inclusive of such hole expansions should be less than the diameter of the valve head 62 or 162. Although the hole expansions $72_a$, $72_b$ and $72_c$ are shown as modifications of the release valve mechanism 152 of the FIG. 6 cutter 110, similar modifications are of course possible with the release valve mechanism 52 of the FIG. 1 cutter 10.

Also, in the FIG. 6 cutter 10, the sleeve 180 extending through the hole 68 in the piston closure plate 66 is fixed to the partition 18. Since no sliding fit is necessary between the sleeve 180 and the closure plate 66, the hole 68 may be made large enough in diameter to provide a clearance between closure plate 66 and sleeve 180 for the required fluid flow.

Figure 14:
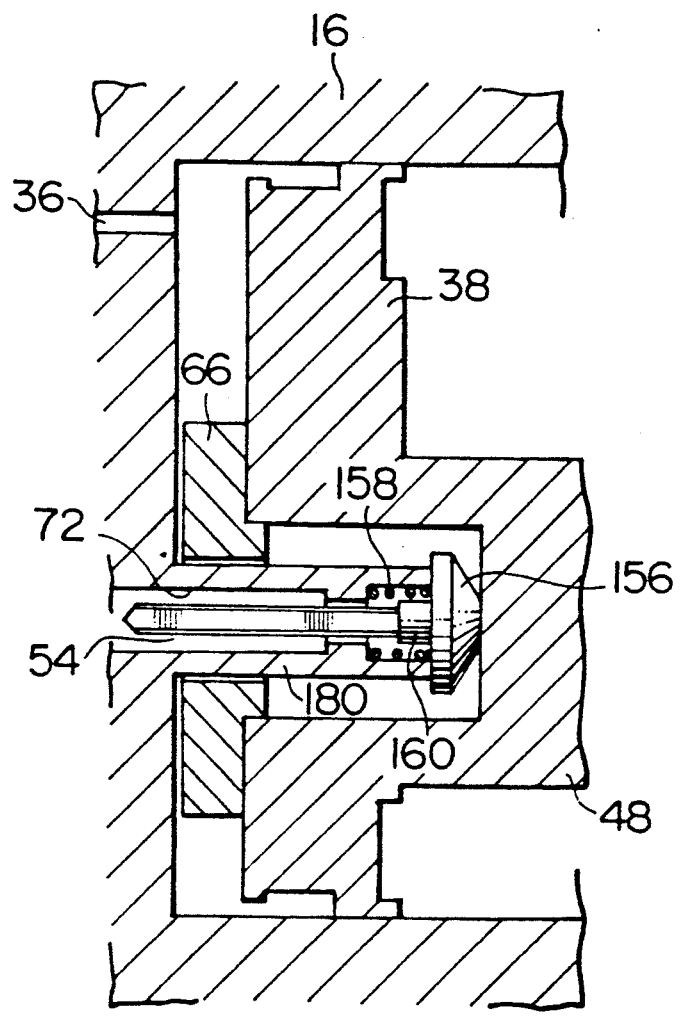
FIG. 14 is a fragmentary axial sectional view of a slight modification of the FIG. 6 cutter.

FIG. 14 shows a slight modification of the FIG. 6 embodiment. In this modified actuator the piston rod 48 is not in axial alignment with the piston 38 but is offset. The offset piston offers the advantage that both piston and piston rod are nonrotatable relative to the housing, making it unnecessary to provide a key or keyway for preventing piston rotation. This arrangement may therefore be advantageously employed in hydraulic devices that are subject to strong external torque loads.

Additional modifications of the illustrated embodiments will readily suggest themselves to one skilled in the art. For example, in the FIG. 1 cutter 10, the release valve member 56 as well as the piston hollow 64 need not be in axial alignment with the piston 38 and the piston rod 48. In the FIG. 6 cutter 110, too, the release valve mechanism 152 including the sleeve 180 could be disposed out of axial alignment with the piston 38.

All these and other modifications, alterations and adaptations of the illustrated embodiments are intended in the foregoing disclosure. It is therefore appropriate that the invention be construed broadly and in a manner consistent with the fair meaning or proper scope of the following claims.

What is claimed is:

1. A fluid operated linear actuator comprising:
   (a) a housing having a pair of opposite ends;
   (b) a piston slidably received in the housing and defining therein a fluid chamber between the piston and one end of the housing, the piton having formed therein a hollow and a hole communicating the hollow with the fluid chamber;
   (c) there being a fluid intake port and a fluid discharge port defined in the housing for the intake of a fluid under pressure into the fluid chamber and for the discharge of the fluid therefrom, at least the fluid discharge port being formed in said one end of the housing;
   (d) release valve means disposed in the fluid chamber and extending through the hole in the piston and into the hollow in the piston so as to permit the movement of the piston relative to the release valve means, the release valve means having a valve head which is disposed in the hollow in the piston and which is movable relative to the housing for opening and closing the fluid discharge port wherein the release valve means further comprises:
      a valve stem extending through the hole in the piston and having the valve head formed on one end thereof, the valve stem being movable with the valve head into and out of abutment against said one end of the housing for opening and closing the fluid discharge port; and
      resilient means acting between the housing and the valve stem for biasing the latter in a direction for opening the fluid discharge port;
   (e) the hole in the piston being formed to include at least one fluid passageway for the admission of the pressurized fluid from the fluid chamber into the hollow in the piston at least during the travel of the piston away from said one end of the housing under the fluid pressure, with the release valve means held closing the fluid discharge port under the fluid pressure acting on the valve head during such piston travel, the maximum diameter of the hole inclusive of the fluid passageway being less than the diameter of the valve head of the release valve means whereby the pressurized fluid being admitted into the hollow in the piston through the fluid passageway acts on the valve head at or toward the end of the travel of the piston away from said one end of the housing thereby causing the release valve means to open the fluid discharge port.

2. The fluid operated linear actuator of claim 1 wherein the release valve means further comprises:
   (a) a sleeve rigidly joined at one end to said one end of the housing and extending through the hole in the piston so as to permit the relative movement of the piston, the sleeve having a hollow extending therethrough for communicating the hollow in the piston with the fluid discharge port in the housing; and
   (b) a valve stem having the valve head on one end thereof and movably extending into the hollow in the sleeve, the valve head being movable with the valve stem into and out of abutment against the other end of the sleeve for opening and closing the fluid discharge port.

3. The fluid operated linear actuator of claim 2 wherein the release valve means further comprises resilient means acting between the sleeve and the valve head for biasing the latter in a direction for opening the fluid discharge port.

4. A fluid operated linear actuator suitable for use in a portable, hydraulic cutter or the like, comprising:
   (a) a housing having a pump section and an actuator section with a partition therebetween, the pump section defining a first fluid chamber for receiving a fluid;
(b) a pump disposed in the first fluid chamber for pressurizing the fluid;
(c) a piston slidably received in the actuator section of the housing and defining therein a second fluid chamber between the piston and the partition, the piston having formed therein a hollow and a hole communicating the hollow with the second fluid chamber;
(d) there being a fluid intake port and a fluid discharge port defined in the partition for the inflow of the pressurized fluid from the first fluid chamber into the second fluid chamber and for the discharge of the fluid from the second fluid chamber back into the first fluid chamber;
(e) release valve means disposed in the second fluid chamber and extending with a sliding fit through the hole in the piston and into the hollow in the piston, the release valve means having a valve head which is disposed in the hollow in the piston and which is movable relative to the housing for opening and closing the fluid discharge port; and
(f) the hole in the piston being formed to include at least one fluid passageway for the admission of the pressurized fluid from the second fluid chamber into the hollow in the piston during the travel of the piston away from the partition under the fluid pressure, with the release valve means held closing the fluid discharge port under the fluid pressure acting on the valve head during such piston travel, the maximum diameter of the hole inclusive of the fluid passageway being less than the diameter of the valve head of the release valve means whereby the pressurized fluid being admitted into the hollow in the piston through the fluid passageway acts on the valve head at or toward the end of the travel of the piston away from the partition thereby causing the release valve means to open the fluid discharge port.

5. The fluid operated linear actuator of claim 4 further comprising a spring mounted within the actuator section of the housing for urging the piston toward the partition.

6. The fluid operated linear actuator of claim 4 wherein the release valve means further comprises a valve stem slidably extending through the hole in the piston and having the valve head formed on one end thereof, the valve stem being movable with the valve head into and out of abutment against the partition for opening and closing the fluid discharge port.

7. The fluid operated linear actuator of claim 6 wherein the release valve means further comprises resilient means acting between the partition and the valve stem for biasing the latter in a direction for opening the fluid discharge port.

8. The fluid operated linear actuator of claim 4 wherein the release valve means further comprises:
(a) a sleeve rigidly joined at one end to the partition and extending through the hole in the piston so as to permit the relative movement of the piston, the sleeve having a hollow extending therethrough for communicating the hollow in the piston with the fluid discharge port in the partition; and
(b) a valve stem having the valve head formed on one end thereof and movably extending into the hollow in the sleeve, the valve head being movable with the valve stem into and out of abutment against the other end of the sleeve for opening and closing the fluid discharge port.

9. The fluid operated linear actuator of claim 8 wherein the release valve means further comprises resilient means acting between the sleeve and the valve head for biasing the latter in a direction for opening the fluid discharge port.

* * * * *